(12) United States Patent
Fry

(10) Patent No.: US 7,881,295 B2
(45) Date of Patent: Feb. 1, 2011

(54) ESTABLISHING DIRECTED COMMUNICATION BASED UPON PHYSICAL INTERACTION BETWEEN TWO DEVICES

(75) Inventor: Jared S. Fry, Boston, MA (US)

(73) Assignee: Scenera Technologies, LLC, Portsmouth, NH (US)

( * ) Notice: Subject to any disclaimer, the term of this patent is extended or adjusted under 35 U.S.C. 154(b) by 1025 days.

(21) Appl. No.: 11/388,516

(22) Filed: Mar. 24, 2006

(65) Prior Publication Data

US 2007/0223476 A1 Sep. 27, 2007

(51) Int. Cl.
*H04L 12/28* (2006.01)
*H04L 12/56* (2006.01)

(52) U.S. Cl. ...................................... 370/392
(58) Field of Classification Search ................ 370/912, 370/392; 345/156
See application file for complete search history.

(56) References Cited

U.S. PATENT DOCUMENTS

| | | | |
|---|---|---|---|
| 6,080,187 A | 6/2000 | Alt et al. | |
| 6,369,794 B1* | 4/2002 | Sakurai et al. | 345/156 |
| 6,861,946 B2 | 3/2005 | Verplaetse et al. | |
| 6,985,773 B2 | 1/2006 | Von Arx et al. | |
| 2004/0169674 A1 | 9/2004 | Linjama | |
| 2004/0215815 A1 | 10/2004 | Rekimoto | |
| 2005/0093868 A1 | 5/2005 | Hinckley | |
| 2005/0113885 A1 | 5/2005 | Haubrich et al. | |
| 2005/0193143 A1* | 9/2005 | Meyers et al. | 709/238 |
| 2005/0212750 A1 | 9/2005 | Marvit et al. | |
| 2005/0243061 A1 | 11/2005 | Liberty et al. | |
| 2006/0097983 A1* | 5/2006 | Haggman et al. | 345/156 |

OTHER PUBLICATIONS

Holmquist, et al., "Smart ITs Friends: A Technique for Users to Easily Establish Connection Between Smart Artefacts," Ubicomp 2001, Atlanta, GA, Sep. 2001, 6 pages.
"Smart ITs Friends: Play Research Partners People Results," [online] Interactive Institute [retrieved on Feb. 22, 2006] Retrieved from the Internet: <URL: http://www.tii.se/play/projects/smart-its/friends/html> 1 page.
Hinckley, et al., "Stitching: Pen Gestures That Span Multiple Displays," May 2004, 9 pages.
Rekimoto, et al., "SyncTap: An Interaction Technique for Mobile Networking," Mobile HCI 2003, 1 page.
"SyncTap: Synchronous User Operation for Spontaneous Network Connection," [online] Personal and Ubiquitous Computing, vol. 8, Issue 2, May 2004 <URL: http://portal.acm.org/citation.cfm> 4 pages.

(Continued)

*Primary Examiner*—Daniel Wu
*Assistant Examiner*—Frederick Ott

(57) ABSTRACT

A method and system for establishing communication with a device is provided. Aspects of an exemplary embodiment include detecting, at a first device, a physical interaction between the first device and a second device; determining a network address usable for establishing communication between the first and second devices based on information derived from the detected physical interaction; and providing for at least one of sending a message directed to the network address from the first device to the second device and assigning the network address to the first device for receiving a message directed to the network address.

32 Claims, 8 Drawing Sheets

OTHER PUBLICATIONS

Holmquist et al., *Smart-Its Friends: A Technique for Users to Easily Establish Connection between Smart Artefacts*, Ubicomp 2001, Atlanta, GA, Sep. 2001.

Rekimoto et al., *SyncTap: An Interaction Technique for Mobile Networking*, Mobile HCI 2003.

Hinckley, *Synchronous Gestures for Multiple Persons and Computers*, Microsoft Research, 2003.

Hinckley, et al.: *Stitching: Pen Gestures that Span Multiple Displays*, May 2004.

SyncTap: *Synchronous User Interactions for Spontaneous Device Associations*; http://www.csl.sony.co.jp/IL/projects/sync/contents.html, 2003.

SyncTap: *Synchronous User Operation for Spontaneous Network Connection*, http://portal.acm.org/citation.cfm, 2004.

*Smart-its Friends*; Play Research Partners People Results—Interactive Institute; http://www.tii.se/play/projects/smart-its/friends.html, Feb. 2006.

Patel, et al.; *A Gesture-based Authentication Scheme for Untrusted Public Terminals*, UIST, Oct. 2004.

\* cited by examiner

Virtual Network Environment, Device Perspective

Common LAN Environment, Device Perspective

Virtual Network Gateway Process

LAN-Router Process

ESTABLISHING DIRECTED COMMUNICATION BASED UPON PHYSICAL INTERACTION BETWEEN TWO DEVICES

BACKGROUND

Distributed sensing techniques for mobile devices using synchronous gestures are known. Synchronous gestures may be defined as patterns of activity performed on two or more devices in a distributed system that have a certain meaning when they occur together in time. The patterns may occur in parallel and synchronously, or they may partially overlap or even occur in a particular sequence. Example implementation and uses of synchronous gestures include the following.

One example is described in a paper by Holmquist et al., *Smart-Its Friends: A Technique for Users to Easily Establish Connection between Smart Artefacts*, Ubicomp 2001, Atlanta, Ga., September 2001. This paper describes a technique that allows a user to connect a pair of accelerometer-augmented handheld devices by holding the two devices together and shaking them to get common movement data. The movement data together with an ID is broadcast to all devices in listening range. When a device receives movement data from another device, the device compares the data to its own most recent movement pattern and establishes a dedicated connection based on the comparison.

Another example is described in US Patent Application No. 20040215815 to Rekimoto et al. (see also Rekimoto et al., *SyncTap: An Interaction Technique for Mobile Networking*, MOBILE HCI 2003). This approach describes a user interface device for specifying a network connection between information apparatuses. When a user wishes to connect two apparatuses, connection buttons on each apparatus are pressed down and released at the same time. Each apparatus then transmits packets containing the IP address of the source device and timing of the press and release of the connection buttons across the network using multicasting. The times included in the packets are then compared with those recorded within the apparatuses to enable both apparatuses to correctly identify each other.

Another example of synchronous gestures is described in US Patent Application No. 20050093868 to Hinckley et al. This application describes distributed sensing techniques for mobile devices that allow the coordination of resources of mobile computing devices to jointly execute tasks. In this method, a first gesture input is received at a first mobile computing device, and a second gesture input is received at a second mobile computing device. In response, a determination is made as to whether the first and second gesture inputs form one of a plurality of different synchronous gesture types. If it is determined that the first and second gesture inputs form the one of the plurality of different synchronous gesture types, then resources of the first and second mobile computing devices are combined to jointly execute a particular task associated with the gesture type. The devices are already connected or have previous connectivity information to enable joint execution of the task. The task that is jointly executed is determined by the gesture. An example task is the sharing of a displayed pictured between two devices, where half is displayed on each device.

Although the techniques described by the references provide gesture-based user interface for devices, these techniques have drawbacks. One drawback is that none of the described methods are scalable such that devices using the internet as their communication means can utilize them for synchronous-gesture based device-device interfacing. Some of the above mentioned methods require the devices to already be communicating with each other prior to a synchronous gesture causing an action, and other methods require that information regarding a detected gesture be multicast/broadcast to every other device within listening range. Multicasting/broadcasting gesture information by each device across the network is not scalable, is less secure than directed communications, and unnecessarily increases network traffic and processing overhead when communication is intended to be directed between two devices. In addition, prior uses of synchronous gestures require that some form of gesture information be contributed by each device and brought together for comparison. This necessary comparison step adds unnecessary processing overhead to the device or devices performing the comparisons.

As discussed above, several advantages can be obtained by eliminating the need to multicast/broadcast gesture information across the network and the need to compare the gesture information between devices in order for communication to occur between two devices. What are needed are methods and systems for determining a network address based on the physical interaction and directing communication to that network address (and therefore to the specific device assigned that network address).

SUMMARY

A method and system for establishing communication with a device is provided. Aspects of the exemplary embodiment include detecting, at a first device, a physical interaction between the first device and a second device; determining a network address usable for establishing communication between the first and second devices based on information derived from the detected physical interaction; and providing for at least one of sending a message directed to the network address from the first device to the second device and assigning the network address to the first device for receiving a message directed to the network address.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to an exemplary embodiment, a method and system are provided for initiating and establishing directed communication between a pair of electronic devices based on characteristics of a detected synchronous gesture, such as by a user physically tapping the two devices together. Both devices are capable of detecting the tapping sequence and its characteristics, and generating network address information for themselves from the detected tapping sequence. Once the devices have each independently generated the address information, the address information is then used by the devices to address and communicate with each other over the network. Accordingly, the exemplary embodiment establishes directed communication between a pair of devices without the need for multicasting/broadcasting packets to provide the content of a message to all devices that are listening without specifying which one of the devices the message is intended for, and without the need to compare gesture information between devices in order for communication to occur between two devices.

Figure 1:
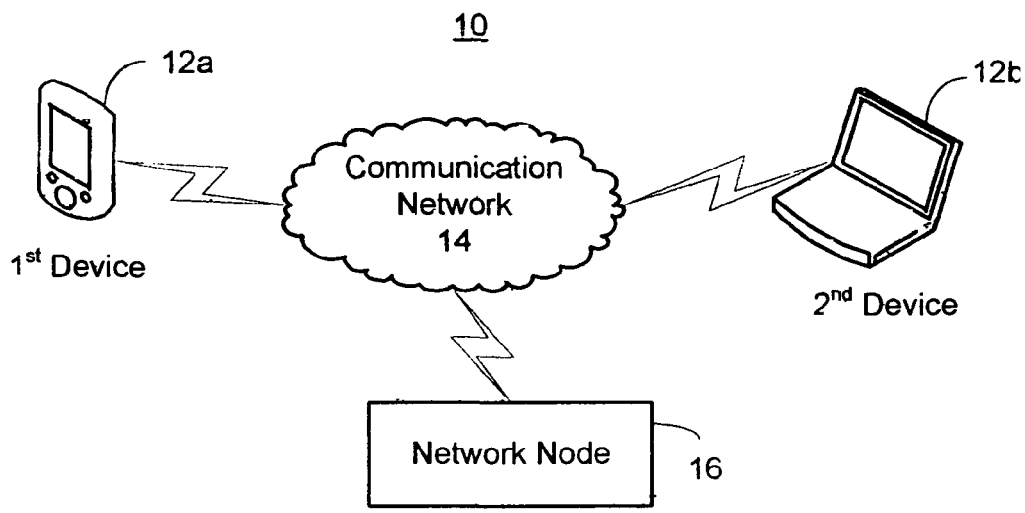
FIG. 1 is block diagram illustrating an exemplary system for establishing a network communication session between a pair of electronic devices based upon a physical interaction.

FIG. 1 is block diagram illustrating an exemplary system for establishing a directed network communication session between a pair of electronic devices 12 based upon a physical interaction. The system 10 includes at least a pair of electronic devices 12, a first device 12a and a second device 12b (collectively referred to as devices 12), communicatively coupled via a communication network 14. The communication network 14 may comprise any type of network, including the Internet, a local area network (LAN), a wide area network (WAN), or a personal area network (PAN), and may be wireless and/or wired. The system 10 may also include network node 16 for facilitating communication across the network. In the Internet or WAN example, the network node 16 may comprise a network gateway server, while in the LAN example, the network node 16 may comprise a router.

Figure 2:
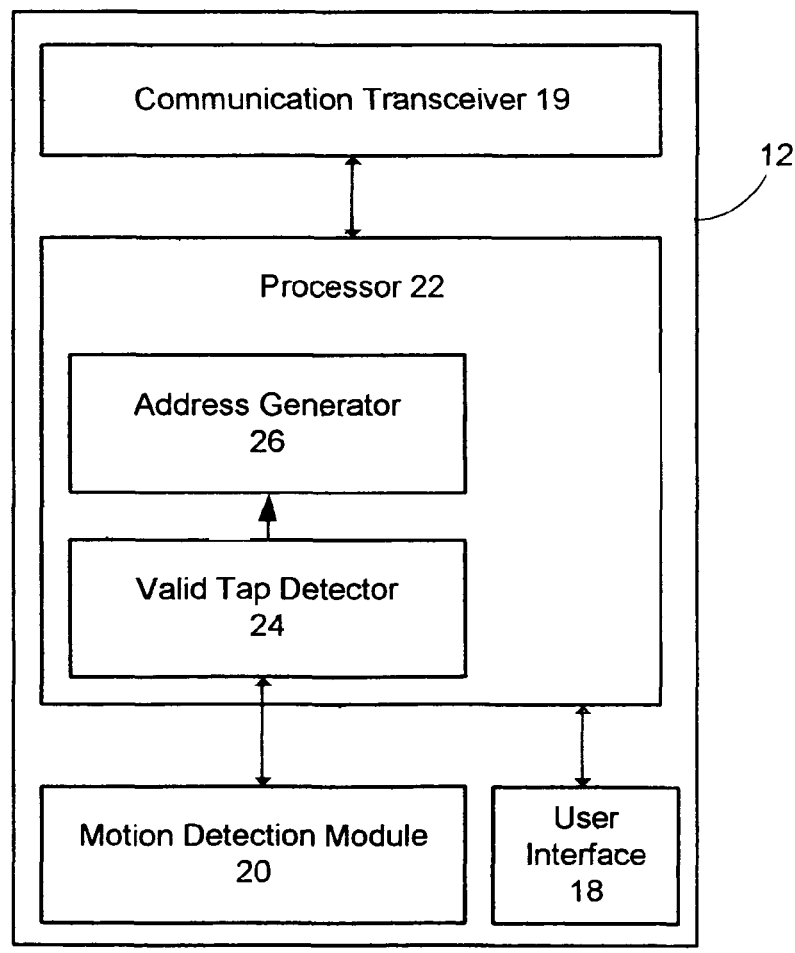
FIG. 2 is a block diagram illustrating components of an electronic device according to an exemplary embodiment.

FIG. 2 is a diagram illustrating components of the electronic devices 12 according to an exemplary embodiment. Each of the electronic devices 12 includes conventional components such as a means for allowing a user to interact with the device 12 and a means for communicating with other electronic devices 12 on a network. For example, the device 12 can include a user interface 18 that includes any number of common input/output components found on mobile devices 12, such as touch screens, keyboards, displays, and microphone, a pointing device, and so on. The device 12 may also include a communication transceiver 19 for establishing a network connection between the other electronic devices 12, and for transmitting and receiving information to and from the network 14. The communication transceiver 19 may be configured to establish a wired or wireless network connection, as it is well known in the art.

Electronic devices 12 with network communication means typically assume an address on the network for receiving communications via the network. That is, the network address typically allows for one electronic device 12a to be sent a message directly by another device 12b. In some situations, a network alias can be used to represent an address.

The term "directed" is used herein to indicate that a message or communication is addressed for a particular destination, such as a device, associated with that address. This is in contrast to general broadcasting or multicasting of messages, where a message is not directed to one particular destination but is instead intended for multiple destinations to receive the message and to process the message, where such processing goes beyond determining if the message is for that respective destination. In some cases, directed communications can be broadcast for the purposes of locating the particular device associated with the address the message is directed to. This, however, is different from broadcasting messages to provide the content of the message to all (or multiple) devices that are listening without specifying which one device the message is intended for.

There are situations where it is desired that two devices 12 communicate with each other, yet they do not necessarily know the identification or address of the other device. For instance, if one has four devices 12 in front of them, and it is desired to transfer content from one of the devices 12 to another, the devices 12 need to be explicitly told by the user which two devices 12 the content should be transferred between. Consider also situations when there are two devices 12 that need to communicate but that have never communicated before and thus do not know each other's network address. Conventional methods may require the user to enter an identification/address into a device 12 using the user interface 18, or it may require the devices 12 to seek out other devices 12 on a network of nearby devices 12 with whom they are able to communicate with, and then provide a list from which the user chooses a destination device 12 from. Or, the device 12 could choose one of the other devices 12 to connect with based on some other attribute or predefined information outside of the user making the choice. Regardless of the method, it is user-intensive for a communication session to be established between two devices 12 (which are intended by the user). In addition, for many devices 12 such as mobile devices 12, the user is provided a very limited user-interface on which to setup a communication session.

According to an exemplary embodiment, a method and system are provided for establishing directed communication between a pair of devices 12 over the network in response to detection of a physical interaction or synchronous gesture, such as tapping the two devices 12 together or simultaneously tapping each device 12 in the same manner. Accordingly, each electronic device 12 is provided with a means for detecting and measuring a physical interaction, such as motion. For example, each electronic device 12 may include a motion detection module 20 that detects and measures characteristics of accelerations that the device 12 is being subjected to in the form of sampled values representing acceleration magnitudes.

Preferably, the motion detector module 20 detects characteristics of a tapping sequence, where a tap is a physical impact imparted on the device 12, and a tap sequence includes one or more taps occurring within a predetermined time period between taps. The tapping characteristics may include timing information and/or acceleration information, such as how many taps occurred within a period of time, the time separating the taps, the magnitude of the acceleration (e.g., impulse) caused by the taps, the rate of change of those accelerations, and the direction of those accelerations (both relative to the device and relative to gravity). Some or all of these characteristics can be used to define a "signature" of the interaction between the devices, as described further below. In one embodiment, the motion detection module 20 includes one or more acceleration detectors or accelerometers that produce an analog signal whose amplitudes are a function of a magnitude and direction of detected accelerations. The motion detection module 20 may further include an analog-to-digital converter (not shown) for digitizing analog signal prior to output. In another embodiment, the motion detection module 20 includes components that provide the same signal information in pulse-width modulated (PWM) format.

Although the exemplary embodiment is described from the point of view of the device 12 being equipped with a motion detector module 20 for detecting and measuring motion, the device 12 may be configured to detect and respond to other types of physical interactions, such as sound, which can be detected and recorded using a common microphone.

Each electronic device 12 also includes a processor 22 for executing program instructions. According to one exemplary embodiment, the electronic device 12 is further provided with a processing means executed by the processor 22 that is responsive to the detecting and measuring the physical interaction (e.g., the motion detection module 20) for determining when the device 12 is subject to a valid physical interaction signal, such as a tap or a tap sequence, by determining if the characteristics of the interaction signal are within predefined acceptable parameters. For example, the device 12 may include a valid tap detector 24 that receives the output from the motion detection module 20, and determines from the time between the impacts and/or the amplitude of an impact whether a valid tap or tap sequence has occurred. Alternatively, the physical interaction signal may comprise an acoustic sequence recorded by a microphone and analyzed by a valid acoustic detector (not shown).

In addition, the electronic device 12 includes a processing means responsive to the valid tap detector 24 for generating a network address representative of the characteristics of the physical interaction signal. For example, the device 12 may include an address generator 26 that generates a network address representative of the accelerations or motions the device 12 was subject to during the tapping sequence.

In an alternative embodiment, the motion detection module 20 may simply output raw accelerometer data, and the valid tap detector 24 is configured to obtain characteristics of the raw data comprising the tap sequence. In another embodiment, the functions performed by the motion detection module 20, the valid tap detector 24, and the address generator 26 may be performed within a single component, e.g., a motion detection module 20 having processing means capable of performing the valid tap detection and address generation functions. Alternatively, the valid tap detection and address generation functions may be performed by a single software component. Or the valid tap detector 24 and address generator 26 may be included as components of a larger software application or implemented as downloadable plug-in modules.

Figure 3:
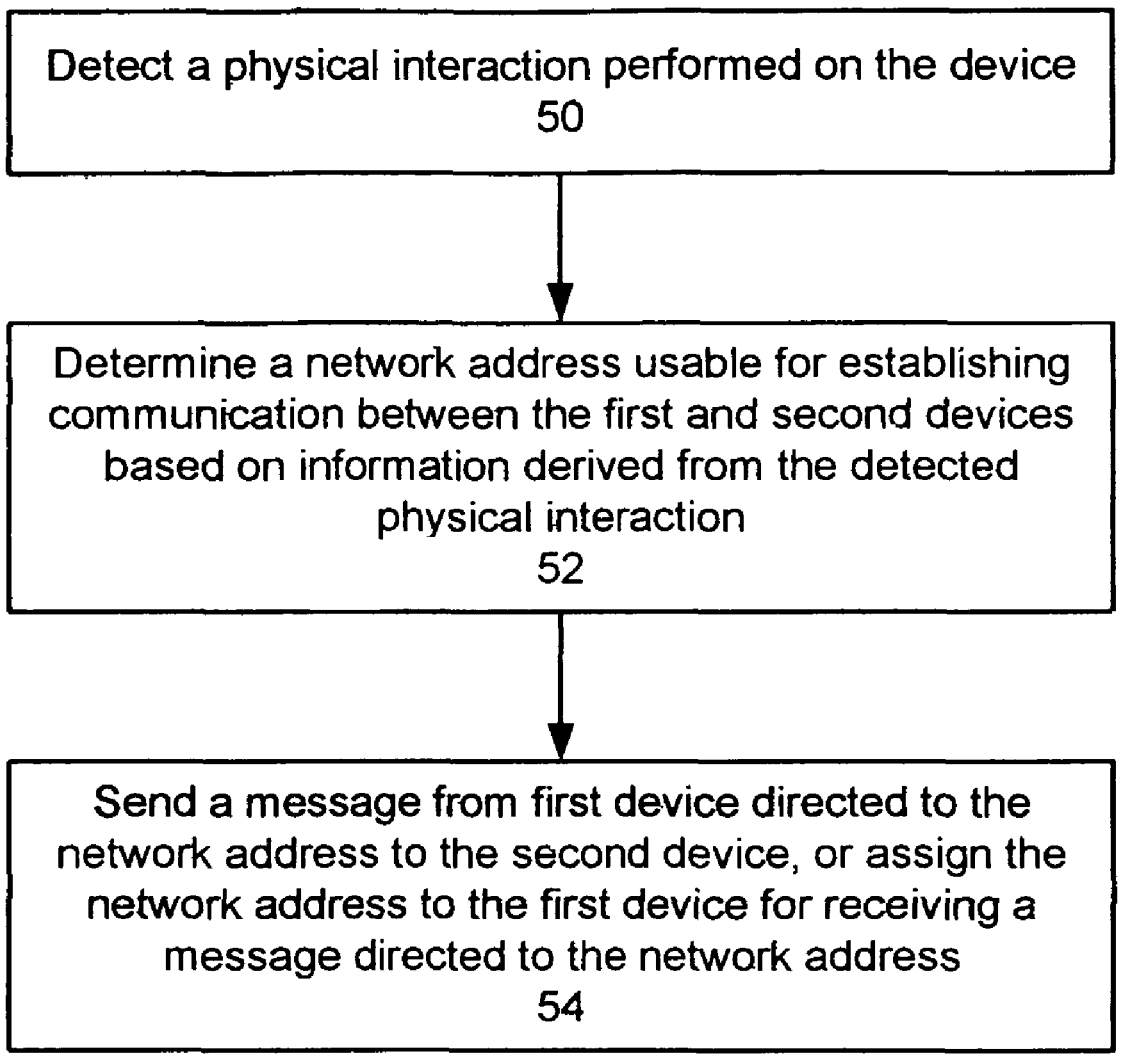
FIG. 3 is a flow diagram illustrating the process of establishing network communication between a pair of electronic devices that are configured as shown in FIG. 1 in accordance with an exemplary embodiment.

FIG. 3 is a flow diagram illustrating the process of establishing network communication between a pair of electronic devices 12 that are configured as shown in FIG. 1 in accordance with an exemplary embodiment. The process begins in block 50 when at least one of the devices 12 detects a physical interaction performed on the device 12, such as a user tapping the two devices 12 together. As described above, the tapping characteristics detected by the motion detection module 20 include timing information and/or acceleration information, such as how many taps occurred within a period of time, the time separating the taps, the magnitude and/or direction of the acceleration caused by the taps, and the rate of change of those accelerations.

Figure 4:
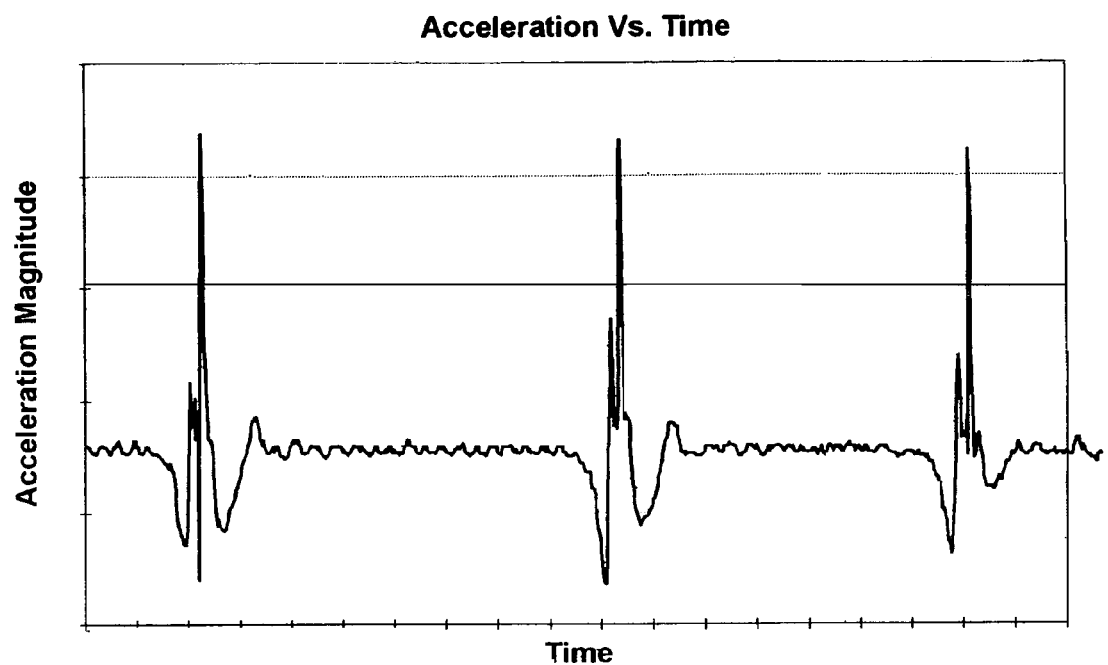
FIG. 4 is a graph of exemplary acceleration measurements detected by the motion detection module showing acceleration magnitudes (y-axis) over time (x-axis).

FIG. 4 is a graph showing exemplary acceleration measurements detected by the motion detection module 20 shown as acceleration magnitudes (y-axis) over time (x-axis). In this example, the set of acceleration measurements were caused by three taps corresponding to the three peaks in acceleration magnitudes.

Figure 5:
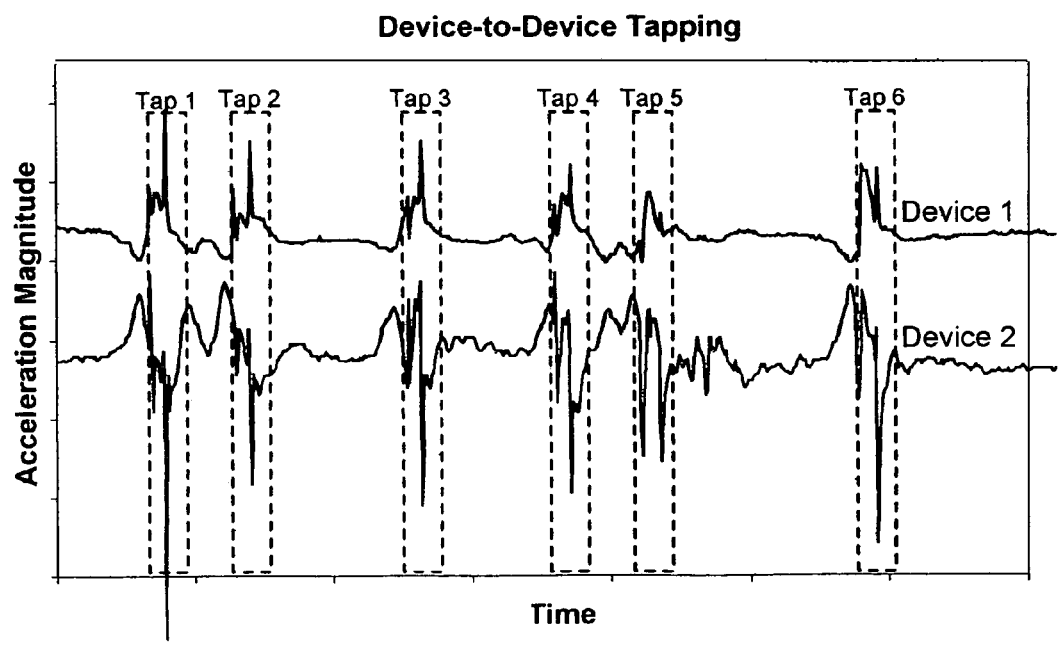
FIG. 5 is a graph of exemplary acceleration measurements from two different devices that were tapped together in a sequence of six taps.

FIG. 5 is a graph showing exemplary acceleration measurements from two different devices 12 that were tapped together in a sequence of six taps (Taps 1 through 6). When a first device 12a and a second device 12b are tapped together, both devices 12a and 12b will likely feel similar accelerations. As shown, the peaks of the acceleration (taps) from both devices 12 are opposite in direction (relative to the orientation of each device) as shown by their respective magnitudes, but occur at substantially the same time. This somewhat depends on the relative orientation of the devices (i.e., if Device 1 in FIG. 5 was turned 180 degrees and given the same tap sequence, the peaks of Devices 1 and 2 would be in the same direction). In practice, the timing and relative magnitudes (i.e., the magnitude of a tap relative to the magnitude other taps detected by that device in the same tap sequence) of the accelerations are typically identical or close to identical, however, absolute magnitudes are unlikely to be identical due to the differences in device construction, device positions and fixations, and pre-impact device speeds. Because of this shared experience of tapping between the devices 12, the second device is able to detect characteristics of the tapping that are substantially similar or identical as the first device. In addition, since timing can be measured with such a high precision, it is extremely unlikely that a third (and forth) device, not involved in the tapping sequence of the first and second devices 12 will detect the same or similar acceleration magnitude within the same time-frame (e.g., +/− 10 seconds).

In response to receiving the tapping characteristics from the motion detection module 20, the valid tap detector 24 determines if a valid tapping sequence has occurred and filters unintentional or false-positive taps. According to the exemplary embodiment, the valid tap detector 24 may be configured to identify a valid tapping sequence from false-positive taps using a variety of methods. For example, a valid tapping sequence could require accelerations above a certain magnitude due to the fact that impact accelerations have a larger magnitude than the type of accelerations felt by a device 12 swinging in one's pocket as they walk. A valid tapping sequence could require change-in-accelerations above a certain magnitude—accelerations due to direct impacts and non-dampened impacts or impacts with low-lasticity generally have much greater changes in acceleration magnitudes. A valid tapping sequence could require that the taps are not spaced by more than a predetermined time interval, and that a complete tapping sequence is required to occur within a predetermined total time duration. In addition, there may be a period of time before and after a tapping sequence where there is a little to no acceleration, representative of the user preparing to tap (possibly looking at the display of the device) and waiting for the resulting actions of the tapping sequence. These book-end periods of low acceleration could be a requirement of a valid tapping sequence. Also, rather than only defining valid tap sequences, acceleration characteristics of common false-positives could be recognized and thus actively filtered out. For example, the accelerations and motions felt by a device 12 carried by someone walking are usually very periodic, consistent, and occur over a large time frame. These characteristics can be used to flag invalid tap sequences.

In one embodiment, valid tap detection could be modal, such that only when the device 12 is in a certain operating mode will the tapping sequence be detected and recognized as valid or intentional. This tapping-enabled mode could be engaged by the user by selecting the mode through the user interface 18, e.g., by pressing a button. Alternatively, the tapping-enabled mode could be engaged by a specialized tap sequence. This specialized tap sequence could, for example, be defined as a three tap sequence that occurs within a preset time period and at a tap frequency that is typically faster than when the device 12 is being walked or bounced on the floor. Once the tapping-enabled mode is engaged, a normal unique tapping sequence can be applied. Other acceleration sequences could also be used to put the device 12 in its tapping-enabled mode, such as the device 12 could be shaken back-and-forth as if one was shaking a container of liquid.

Referring again to FIG. 3, in block 52 a network address usable for establishing communication between the first and second devices 12 is determined based on information derived from the detected physical interaction. For example, the process of determining the network address can be accomplished as follows. In response to the address generator 26 receiving the tapping characteristics of a valid tap sequence from the valid tap detector 24, the address generator 26 calculates a signature representative of the accelerations the device 12 was subject to during the tapping sequence. As used herein, a signature is an abstraction of key data points from the tapping characteristics, such as the number, the timing and/or the magnitudes of the accelerations, etc., that may be used to identify the tap sequence. This signature may be calculated in a manner that is useful as an address.

According to the exemplary embodiment, a signature can be generated based on the time between taps. For example, if a tap sequence occurred between two devices 12 that included 4 taps with 0.34 s, 1.1 s, 0.65 s, 0.42 s of time between each tap (respectively), then a signature associated with the tap sequence could be 4.034.110.065.042.

In an alternative embodiment, the signature may be calculated based on a combination of the relative time period between taps and the absolute time occurrence of the taps. If available to the device, the absolute time that the taps were detected could be recorded in Greenwich Mean Time (GMT), and added to signature, thus providing the physical interaction and subsequently derived address a global timestamp that makes the address more distinct.

Figure 6:
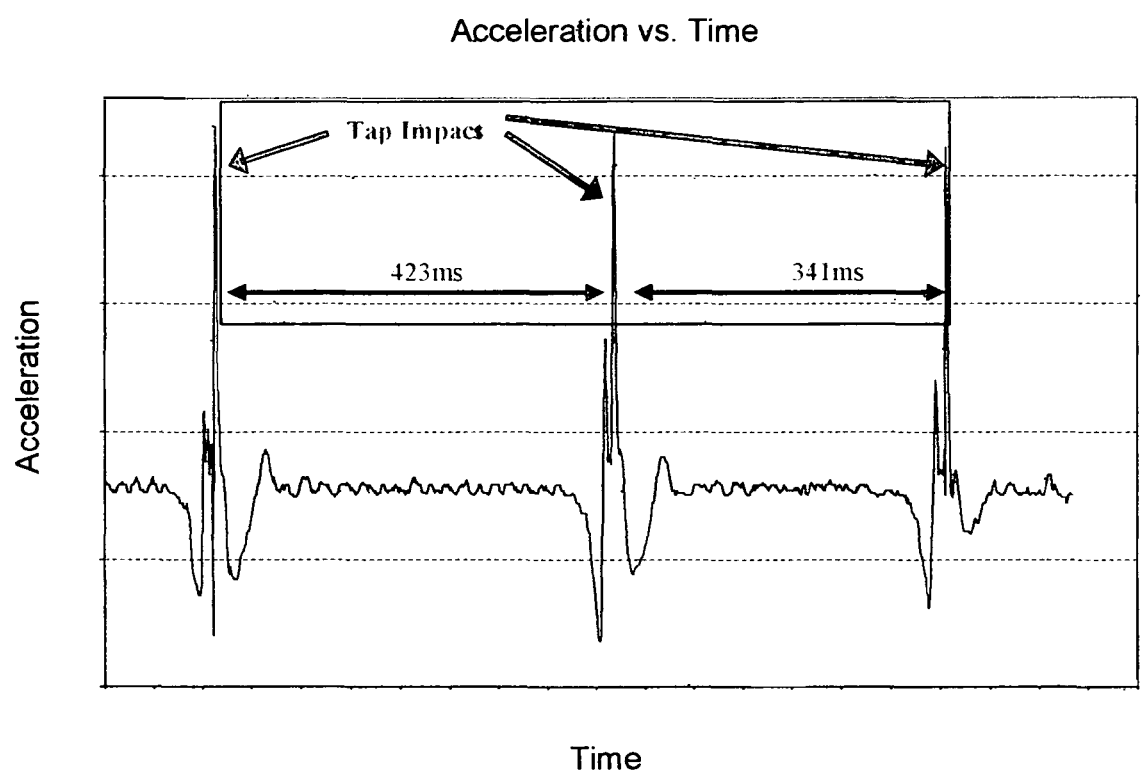
FIG. 6 is a graph of an exemplary acceleration measurements recorded by the motion detection module showing the timing of impacts in the form of acceleration magnitudes (y-axis) over time (x-axis).

FIG. 6 is a graph of an exemplary acceleration measurements recorded by the motion detection module 20 showing the timing of impacts in the form of acceleration magnitudes (y-axis) over time (x-axis). In this example, three tap impacts were detected. Assuming the time of first tap detection was 13:49:03 GMT, the time of the second tap was +00:00:00.423, and the time of the third tap was: +00:00: 00.341, then the following signature may be generated: 1349.3.423.341, where "1349" is the time of day, "3" is the total number of taps, "423" is the time between tap 1 and 2, and "341" is the time between taps 2 and 3. Alternatively, the signature may be generated from the GMT time of each tap. Many combinations of GMT, time between taps and other characteristics are possible for use as a signature.

After the network address is determined, the network address is used by the devices 12 to address each other and communicate with each other. Referring again to FIG. 3, this is accomplished in block 54, in which the first device 12a sends a message directed to the network address to the second device 12b, or the network address is assigned to the first device 12a for receiving a message directed to the network address. Alternatively, the communication session could be assigned an address that is established based on the signature of the tapping sequence between the devices 12, rather than each device 12 having an address that is based on the signature of the tapping.

In one embodiment, once the devices 12 have each independently detected the tap sequence and generated an address, a message is sent directly between the devices 12. In another embodiment, one of the devices 12 can register the address with a network node 16, thus allowing the other device 12 to communicate with the first device 12 by means of using the registered address. Note, that in the embodiment where the devices 12 generate a signature, the signatures independently generated by the two devices 12 should be substantially the same since the signatures are derived from characteristics of the same tap sequence. As described below, however, each device 12 may modify/augment the signature to generate separate addresses as appropriate for the application. Once the devices 12 know how to communicate with each other (e.g. by knowing each other's network address), they can proceed to carry out their tasks. Once the devices 12 are paired, they can decide to switch to a different addressing and/or communication scheme.

Note that the addressing scheme based on tapping characteristics may reside in an application layer which sits on top of an existing network system 10, such as the Internet or LAN. The addresses derived from the tapping sequences, can also be referred to as aliases. In another embodiment, the addressing scheme may operate as a virtual network on top of a traditionally device-to-device network environment, such as a Bluetooth network.

According to the exemplary embodiments disclosed, an easy, quick, and secure method and system for establishing directed network communication between two devices 12 is provided. The tapping process is simple and easy to perform by a user and requires very little decision and device interaction by the user. The tapping process and subsequent address generation allows devices 12 to establish a common address without using a traditional communication so that a secure communication session can be established over traditional communication means, significantly reducing the chance that the common address can be intercepted by a third-party. The method is secure through the fact that the two devices 12 need to be near each other in order to be tapped together or otherwise at the same time, and devices 12 may not require information regarding each other prior to addressing and communicating with each other.

According to a further embodiment, because there are certain communication methods as well as tasks that require one device 12 to perform one set of actions, and the other device 12b to perform other actions, roles for the two devices 12a and 12b may need to be established. These roles could be characterized as the initiator and the responder. These roles, in some instances, may be necessary to define which device 12 should perform a predefined action, or which device 12 should sit back and wait for a request. These roles could be used to determine which device registers the tapping-derived network address with the network or network infrastructure or otherwise assigns the network address to itself, and which device communicates to it (typically, two devices 12 can not both own the same address and thus the roles could determine who claims the address and who communicates to it, or an offset of that address).

For example, where the devices 12 communicate via the internet, a network node 16, such as a server could act as a virtual network gateway, where one device communicates with the other via the server. In one embodiment, the initiator device 12a derives the network address from the tapping characteristics and sends a message to the server requesting that the server assign the network address to the initiator device 12a and register the network address on the server. The responder device 12b, having felt the tap sequence as well, would generate the network address and send a message directed to the network address (i.e., the destination address) via the server. When the server receives this message from the responder device 12b, the server maps the destination network address in the message to the initiator device 12 and routes the message to the initiator device 12a.

In a second embodiment, it is the responder device 12b that sends a message to the server requesting that the server assign and register the network address in response to a tap sequence. The initiator device 12a, having felt the tap sequence as well, generates the network address and sends a message directed to that address via the server. When the server receives this message from the initiator device 12a, the server maps the destination network address in the message to the responder device 12b, and then routes the message to the responder device 12b. Note, in both examples, the network address that is generated by the devices 12 and registered with the server may be different than the device's actual physical address on the network to which the message is ultimately routed. In this case, the server stores the generated network address in association with the registering device's physical address.

As a further example, consider an embodiment where the devices 12 communicate via a common routed LAN infrastructure (over Ethernet or WiFi). In this environment, a first device 12a could, upon detecting a valid tap sequence, request from a network router an IP Address based on the characteristics of the tap sequence. For practicality reasons, this requested IP address could be an address typically not used or in a reserved address space. For example, based on a tapping sequence, the first device 12a could request the IP address 192.15.213.143, where "15" is the octet distinguishing a reserved address space, and where "213.143" are derived from the characteristics of the tapping sequence. The second device 12b, having detected the same tap-sequence, and knowing that the address space 192.15.xxx.xxx is reserved for tapping-based device pairing and communication, could communicate to the first device 12a by using its independently derived address 192.15.213.143 for the first device 12a.

After the roles, such as initiator and responder, for the devices 12 are determined, as described further below, then the roles information may be added to the signature to complete the addresses for the devices 12. Continuing with the first example above, an "i" (or other preset indication) may be added to the signature to provide a network address of 4.034.110.065.042i for the initiator device. Similarly, an "r" (or other preset indication) could be added to the signature of the other device, the responder, to assign the network address 4.034.110.065.042.r to that device. Just the same, these role indicators could be "0" and "1" rather than "i" and "r", or one could be just an incremented address of the other. These network addresses, because they are for the purpose of a particular communication task/session, could be temporary in nature, and could expire after a predetermined period of time (thus also contributing to their uniqueness by referencing the event to a position in time).

Also, one device 12a may complete the network address of the other device 12b based on the assigned roles and send a message directly to that address to communicate to the other device 12b, and/or the device 12a may complete its own address based on the assigned roles and register its own network address on the server.

Defining which device 12 assumes the role or initiator and which device 12 assumes the role of responder could occur using a variety number of methods. For example, the roles could be established based on the operating mode of the device. That is, one device 12 could be put into one role explicitly by the user. This includes the user selecting the role from a menu on the device's user interface 18, by flipping a switch, or by holding down a particular button during the tapping. Just the same, the other device 12 could be explicitly put into the other role, or could be by default in the other role (responder).

The roles could also be device-based or profile-based where devices 12 act in a certain role all the time. Similarly, the roles could be established based on the capability of the devices 12. The roles could be context based or situation-dependent. If one device 12a has content selected or is in the middle of a particular process, and a second device 12b is in an idle state, the first device 12a could act as the initiator and the second device 12b could act as the responder. This contextual or situational basis could include location information, process information, user information, and so on. The roles could be established based on which device 12 physically taps which device. That is, the tapper could take on the initiator role and the tappee could take on the responder role. The determination of which device 12 is actually tapping which device 12 could be detected by the accelerometers on the devices 12 to determine which device 12 was accelerated prior to the first tap. For example, if one device 12 is tapping the other, it will be subject to an acceleration or motion prior to the impact of the first tap (that is opposite in direction to the acceleration felt at the first impact). The presence of this pre-tap acceleration of motion could be used as the determining factor of which device 12 takes on which role.

There may be instances where the devices 12 need to communicate with each other first to determine who is the initiator and who is the responder, to determine what actions need to be taken and by who, or there are potentially cases where no role is needed or desired. In that light, there are cases where both devices 12 may attempt to request/register for themselves the same address—which typically would not be allowed in the network environment. To handle such cases, the devices 12 could wait a random delay prior to requesting/registering an address, and then the address could be given on a first-come-first-serve basis. The device 12 which requests the address second, will learn that the address is already registered to another device, and will then communicate to the other device 12 having realized that it was second. Other precautions could also be taken to handle the potential situation where the address is in use by a device 12 other than the devices 12 involved in the tapping. In such a situation, the devices 12 involved in the tapping could then increment the address by a predetermined amount and go through the requesting and communicating process again.

There is the possibility, though highly unlikely, that another device 12 pair would have created a similar or identical signature from a tapping sequence and thus contention would be caused as there would then be four devices 12 trying to use the same address for two different communication sessions. In these cases, if there is an initiator device, it would be able to detect that the particular address is in use by another. Having detected that the address is already being used, the device 12 could instruct the user to re-tap the devices 12 together. The initiator could even tell the other device 12 to abort its registered address so that the wrong responder does not communicate with it, or, if the other set of devices 12 are already communicating with each other, the initiator could ask them to move to a different address or address space, thus freeing up the addresses in demand.

In some implementations, depending on the accuracy of the motion detection module 20 and sampling frequency, some level of discrepancy of signatures between devices 12 could be experienced. For example, signatures 123.456.789 and 122.456.788 may be determined by the first and second device 12 (respectively). There are a number of mathematical methods for reconciling the difference, such as rounding the numbers or using methods similar to fuzzy matching algorithms.

Note, that the roles, as described above, could also be opposite. That is, the responding device 12 (or the second device) could be the one that requests to register an address with the network node 16, and the initiator could be the one that communicates to the responding device 12 using that address.

In yet a further embodiment, after a message is sent to the generated network address or the network address is assigned to one of the devices 12, at least one of the devices 12 may be configured to automatically perform a predefined action associated with the detected physical interaction.

There are many examples of types of actions that could be performed after establishment of the communication session between the devices 12. For example, one could tap their digital camera against their laptop computer and the digital camera could be configured to automatically transfer pictures to the laptop. As a second example action, the laptop could be configured to provide the camera access to the file system of the laptop from which the user could move content between. In a third example, a user could select a phone number on their PDA, tap their PDA against their cellular handset, and the cellular handset could automatically call the number selected on the PDA (these examples all assume network connectivity of the devices 12). Regardless of the task at hand, at least one of the devices 12 involved should have a predefined action associated with the act of tapping.

Example categories of actions that may be performed in response to detection of a valid tap sequence include the following:

Transferring content (e.g., pictures, email, contact information)
Transferring device state
Synchronizing Content
Synchronizing Presentation of Content
Authorizing a device to use a wireless network
Conferencing-in a third phone into a call
Establishing a second mode of communication that is highly secure There are various method of configuring the device 12 to execute actions once tapped and a network connection established. Each device 12 may be configured with a default action, such that every time one device 12 is tapped against another, a particular action is performed. The action could be as simple as giving a device 12 access to another's file system, or the action could be automated like synchronizing content between devices 12. The default action, and actions in general, may be associated with the roles. That is, the predefined action(s) performed by a particular device 12 when the device 12 is in the initiator role may be different from the predefined action(s) performed by the device 12 when in the responder role.

Each device 12 may be configured to perform different actions, and there are various methods for determining which action to perform. For example, if a user has selected content on device 12 prior to the tapping, the device 12 may be configured to automatically transfer that content to the other device 12 as long as the second device 12 is able to accept the content of the first. Note, if content was selected on both devices 12, both contents could be transferred between the devices 12, or the content selected on the second device 12 could remain un-transferred based on the fact that the first device 12 "tapped" the second one and not the other way around, which could be controlled by the assigned device 12 roles.

Determining which action to perform may be based on device profiles, where different devices 12 may be assigned different profiles. Each profile may indicate what actions are to be performed given a set of circumstances. For example, given a digital camera and a television, the television may have a profile of being a display, such when the devices 12 are tapped together, content displayed on the LCD of the camera is automatically routed to the television for display. If the digital camera had tapped a laptop computer instead, the task performed may be different assuming the profile of the laptop is different. For example, the laptop could have a storage device profile associated with it, and thus the act of tapping the devices 12 together may cause the pictures from the digital camera's storage memory to be transferred to the storage memory of the laptop.

In another embodiment, the devices 12 could seek out what action to perform between two devices 12 that were tapped by providing a user with a list of options to choose from on a display screen. This act of seeking out device-to-device actions would itself be the pre-defined action, as described above.

Figure 7:
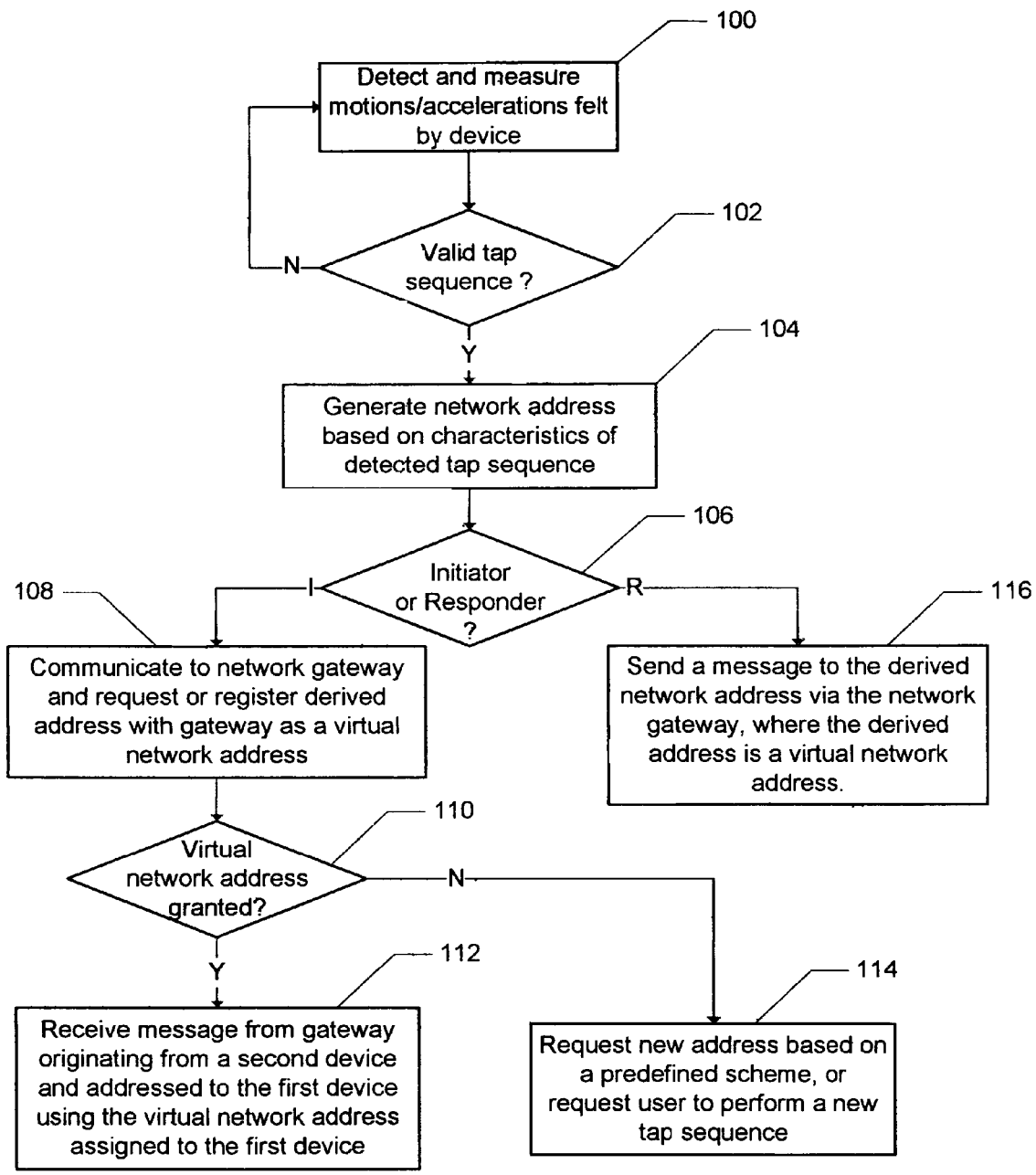
FIG. 7 is flow diagram illustrating the process performed by a device in a virtual network environment, where the device provides for requesting to be assigned an address from a virtual network gateway and/or sending a message to an address associated with a virtual network environment.

FIG. 7 is flow diagram illustrating the process performed by a device in a virtual network environment, where the device provides for requesting to be assigned an address from a virtual network gateway and/or sending a message to an address associated with a virtual network environment. The address requested is based on the tapping sequence felt by the device 12 and is a virtual network address, instead of, for example, a conventional IP address. Note, this flow diagram depicts two different scenarios, one where the device 12 determines that it should be the device 12 requesting the assignment of the derived address, and one where the device 12 determines that it should be communicating to the derived address.

The process begins in block 100 when the motion detection module 20 of the device 12 detects and measures motions/accelerations imparted on the device. In block 102 the valid tap detector 24 determines whether the acceleration information constitutes a valid tap sequence. If not, the process continues at block 100. Once a valid tap sequence has been detected, then in block 104 the address generator 26 generates a network address based on characteristics of the detected tap sequence. In block 106, it is determined whether the device 12 will act in the role of the initiator or the responder. In one embodiment, a signature may be generated from the characteristics of the tap sequence in block 104 and is used as the network address; and the determination of the role in block 106 controls whether the device registers the network address or sends a message directed to the network address. In an alternative embodiment, the network address is completed in block 106 once the role is determined in block 106 by modifying the signature accordingly.

If in block 106, it is determined that the device 12 is the initiator, then in block 108 the device 12 communicates with the network gateway and requests to be assigned the derived network address or registers the derived network address with the network gateway as a virtual network address. If the network gateway grants the virtual network address and assigns the network address to the device 12 in block 110, then in block 112, the device 12 receives a message from the gateway originating from a second device 12 that is addressed to the first device 12 using the virtual network address that was assigned to the first device. If the network gateway does not grant the virtual network address to the device 12 in block 110, then in block 114 the device 12 requests a new address based on a predefined scheme or the device 12 requests the user to perform a new tap sequence.

If in block 106, it is determined that the device 12 is the responder, then in block 116 the device 12 sends a message to the derived network address via the network gateway, where the derived address is a virtual network address.

Figure 8:
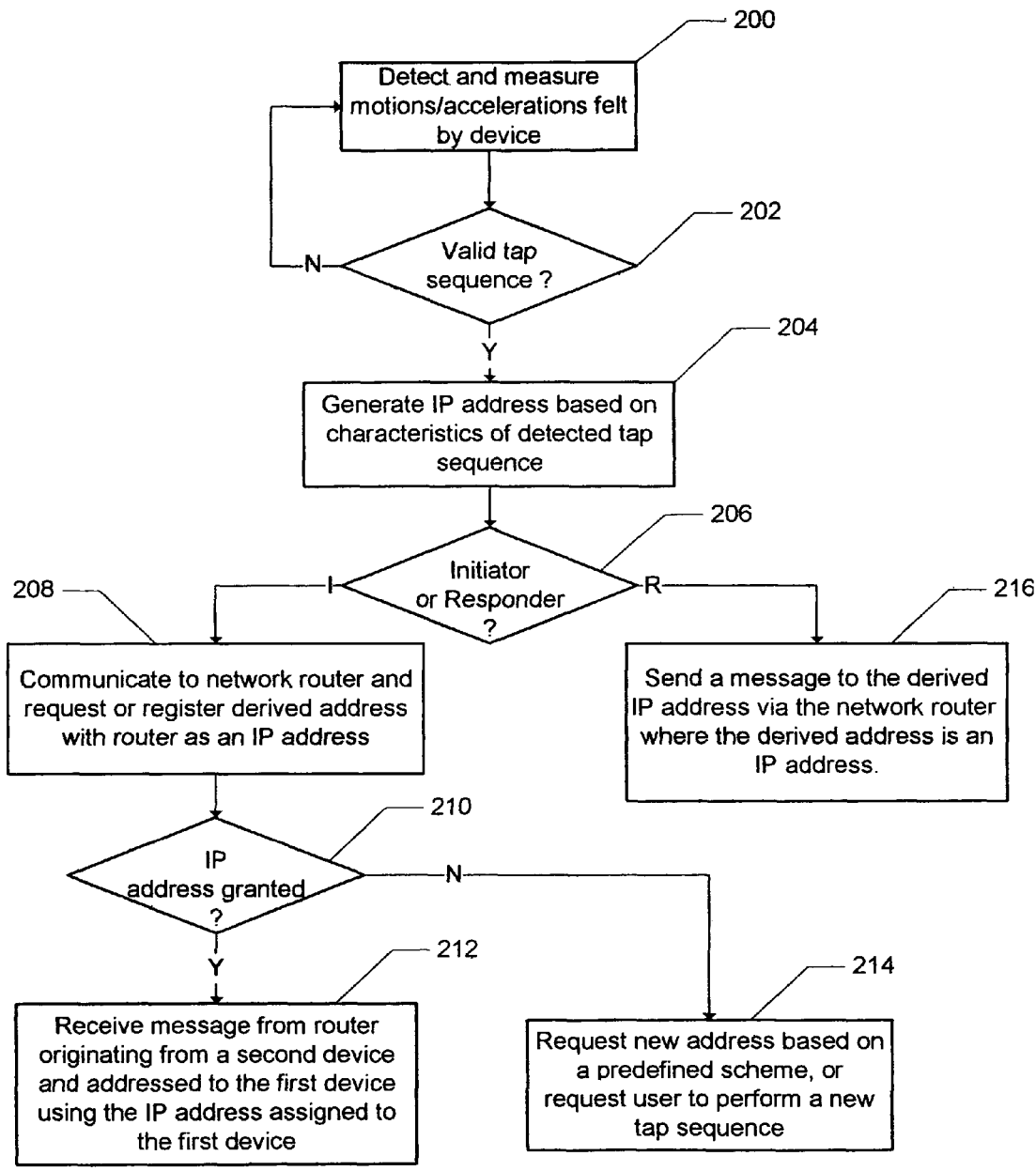
FIG. 8 is a flow diagram illustrating the process performed by a device in a LAN environment, where the generated addresses are IP addresses, rather than virtual addresses.

FIG. 8 is a flow diagram illustrating the process performed by a device 12 in a LAN environment, where the generated addresses are IP address, rather than virtual addresses. The process begins in block 200 when the motion detection module 20 of the device 12 detects and measures motions/accelerations imparted on the device. In block 202 the valid tap detector 24 determines whether the acceleration information constitutes a valid tap sequence. If not, the process continues at block 200. Once a valid tap sequence has been detected, then in block 204 the address generator 26 generates a network address based on characteristics of the detected tap sequence. In block 206, it is determined whether the device 12 will act in the role of the initiator or the responder. In one embodiment, a signature may be generated from the characteristics of the tap sequence in block 204 and is used as the network address; and the determination of the role in block 206 controls whether the device registers the network address or sends a message directed to the network address. In an alternative embodiment, the network address is completed in block 206 once the role is determined in block 206 by modifying the signature accordingly.

If in block 206, it is determined that the device 12 is the initiator, then in block 208 the device 12 communicates with the network router and requests to be assigned the derived network address or registers the derived network address with the network router as a IP address. If the network router grants the IP address and assigns the IP address to the device 12 in block 210, then in block 212, the device 12 receives a message from the router originating from a second device 12 that is addressed to the first device 12 using the IP address that was assigned to the first device. If the network router does not grant the IP address to the device 12 in block 210, then in block 214 the device 12 requests a new IP address based on a predefined scheme or the device 12 requests the user to perform a new tap sequence.

If in block 206, it is determined that the device 12 is the responder, then in block 216 the device 12 sends a message to the derived network address via the network router, where the derived address is an IP address.

Figure 9:
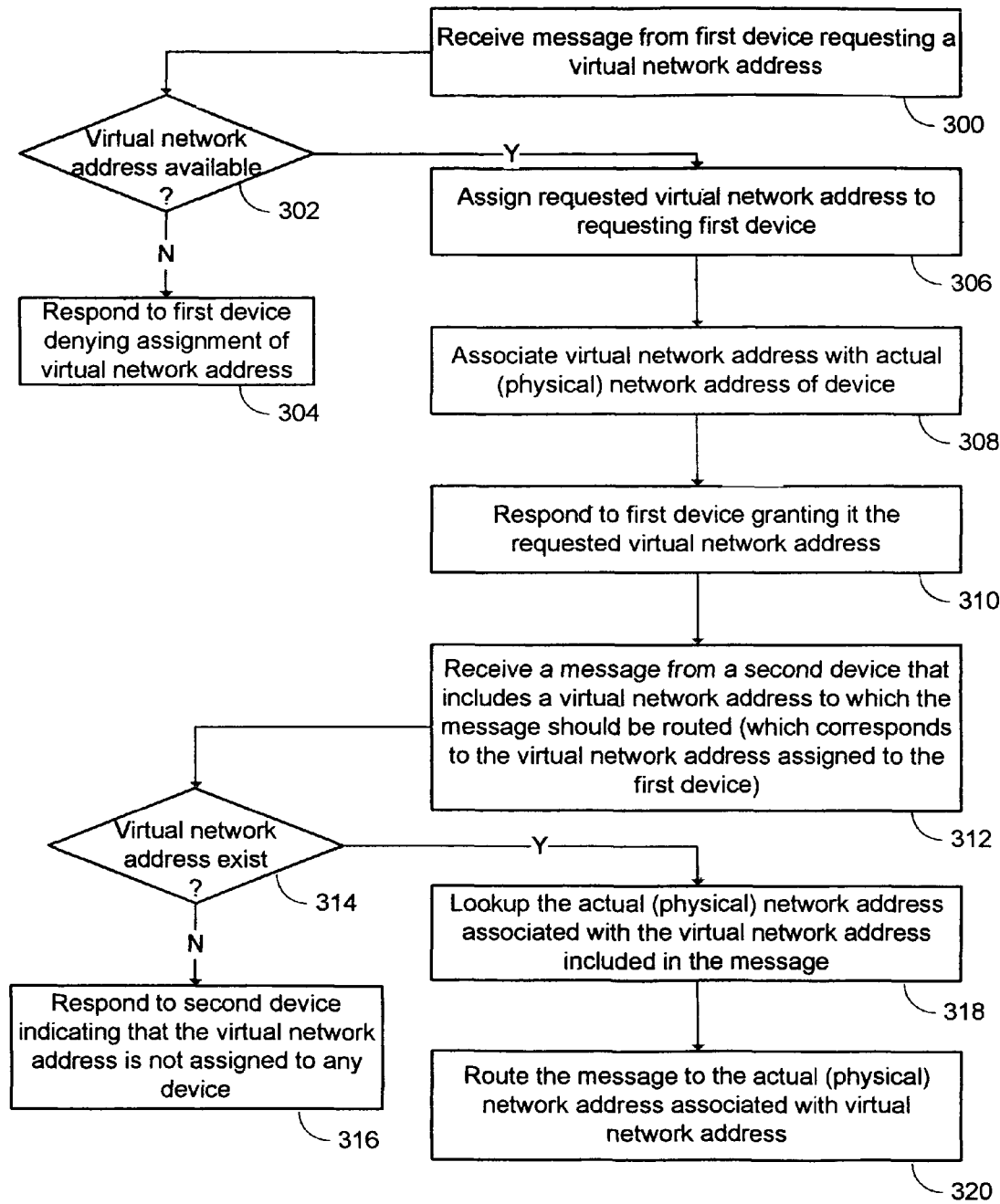
FIG. 9 is a flow diagram illustrating the process performed by the network node, such as a gateway or server, in the virtual network embodiment.

FIG. 9 is a flow diagram illustrating the process performed by the network node 16, such as a gateway or server, in the virtual network embodiment. The process begins in block 300 when the network node 16 receives a message from the first device 12 requesting assignment of a virtual network address. In block 302 it is determined if the requested virtual network address is available. If not, then in block 304 the network node 16 responds to the first device 12 denying assignment of the virtual network address. If the virtual network address is available in block 302, then in block 306 the network node 16 assigns the requested virtual network address to the first device 12. In block 308, the virtual network address is associated with the actual physical network address of the first device 12. In block 310, the network node 16 responds to the first device 12 granting the first device 12 the requested virtual network address. In block 312, the network node 16 receives a message from a second device 12 that includes a virtual network address to which the message should be routed, which corresponds to the virtual network address assigned to the first device 12.

In block 314, it is determined whether the virtual network address exists. If not, then in block 316 the network node 16 responds to the second device 12 that the virtual network address is not assigned to any device. If the virtual network address does exist in block 314, then in block 318 the network node 16 looks up the actual physical network address associated with the virtual network address. Finally, in block 320, the network node 16 routes the message from the second device 12 to the actual physical network address associated with the virtual network address.

Figure 10:
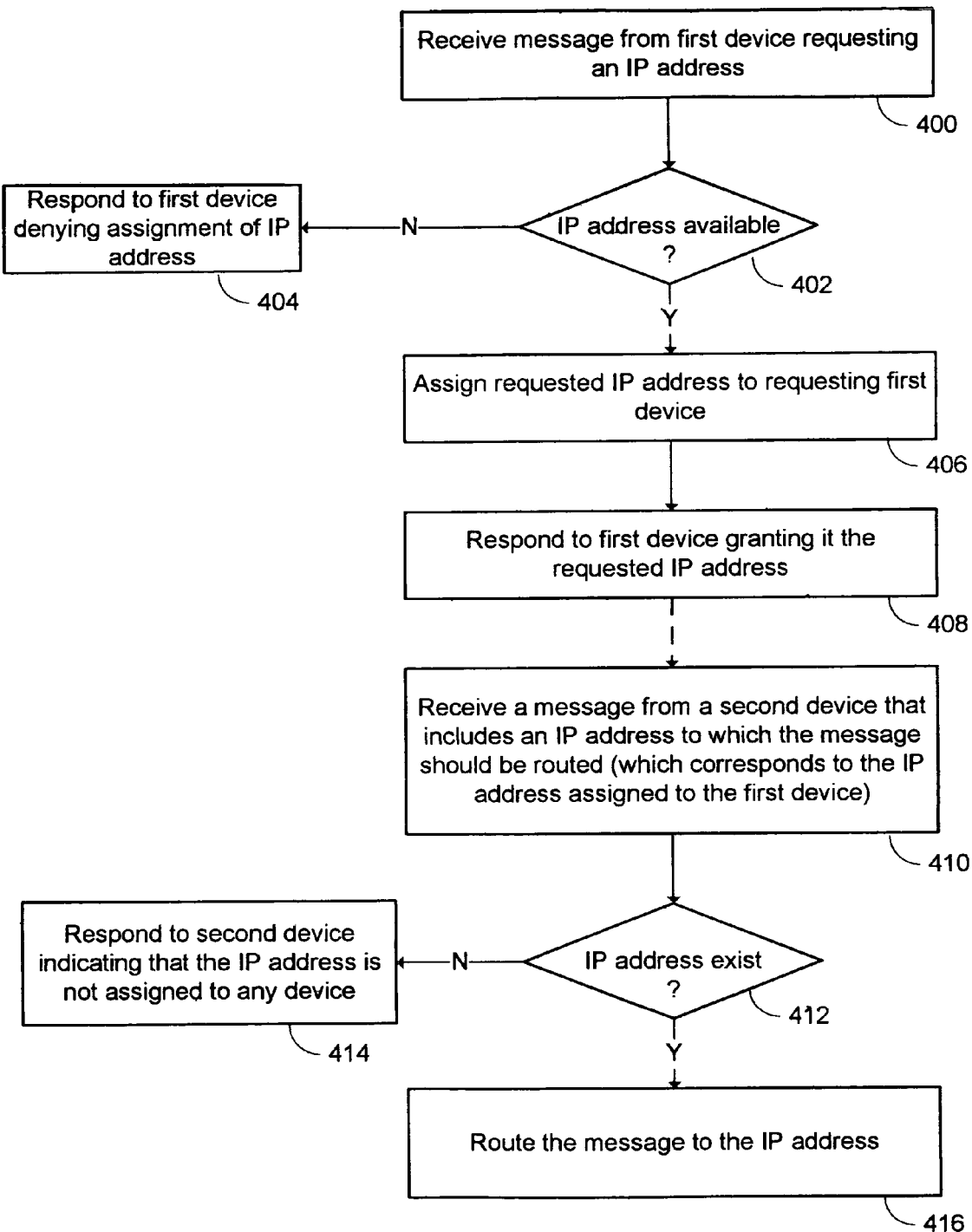
FIG. 10 is a flow diagram illustrating the process performed by the network node, such as a router, in the LAN embodiment.

FIG. 10 is a flow diagram illustrating the process performed by the network node 16, such as a router, in the LAN embodiment. The process begins in block 400 when the network node 16 receives a message from the first device 12 requesting assignment of an IP address. In block 402 it is determined if the requested IP address is available. If not, then in block 404 the network node 16 responds to the first device 12 denying assignment of the IP address. If the IP address is available in block 402, then in block 406 the network node 16 assigns the requested IP address to the first device 12. In block 408, the network node 16 responds to the first device 12 granting the first device 12 the requested IP address. In block 410, the network node 16 receives a message from a second device 12 that includes an IP address to which the message should be routed, which corresponds to the IP address assigned to the first device 12.

In block 412, it is determined whether the IP address exists. If not, then in block 414 the network node 16 responds to the second device 12 that the IP address is not assigned to any device 12. If the IP address does exist in block 412, then in block 416 the network node 16 routes the message from the second device 12 to the IP address.

According to the exemplary embodiment, a method and system have been described for initiating and establishing directed network communication between a pair of electronic devices 12 based on characteristics of a detected physical interaction, such as by a user physically tapping the two devices 12 together. Both devices 12 are capable of detecting the tapping sequence and its characteristics, and generating network address information for themselves from the detected tapping sequence. Once the devices 12 have each independently generated the address information, the address information is then used by the devices 12 to address and communicate with each other over the network, preferably without the need for broadcasting packets.

The executable instructions of a computer program as illustrated in FIG. 3 and FIGS. 7 through 10 can be embodied in any computer readable medium for use by or in connection with an instruction execution system, apparatus, or device, such as a computer based system, processor containing system, or other system that can fetch the instructions from the instruction execution system, apparatus, or device 12 and execute the instructions.

As used here, a "computer readable medium" can be any means that can contain, store, the program for use by or in connection with the instruction execution system, apparatus, or device. The computer readable medium can be, for example, but not limited to, a semiconductor system, apparatus, device, or medium.

More specific examples (a non-exhaustive list) of the computer readable medium can include the following: a portable computer diskette, a random access memory (RAM), a read only memory (ROM), an erasable programmable read only memory (EPROM or Flash memory), a portable compact disc (CD), a portable digital video disc (DVD), and the like.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for establishing communication with a device, the method comprising:
   detecting, at a first device, a physical interaction between the first device and a second device;
   determining a network address usable for establishing communication between the first and second devices based on information derived from the detected physical interaction; and
   providing for at least one of sending a message directed to the network address from the first device to the second device and assigning the network address to the first device for receiving a message directed to the network address.

2. The method of claim 1 wherein determining the network address includes determining the network address based on a tapping characteristic of the physical interaction.

3. The method of claim 2 wherein the tapping characteristic of the physical interaction is a signature of a tapping sequence.

4. The method of claim 1 wherein the information derived from the detected physical interaction to form the network address includes at least one of timing information and acceleration information.

5. The method of claim 4 wherein the timing information and the acceleration information include at least one of how many taps occurred within a period of time, time separating the taps, magnitude of the acceleration caused by the taps, and a rate of change of the accelerations.

6. The method of claim 1 wherein providing for at least one of sending a message directed to the network address from the first device to the second device and assigning the network address to the first device for receiving a message directed to the network address includes determining a role for the first device, wherein the role includes one of a sender of the message and a receiver of the message.

7. The method of claim 6 wherein determining the role for the first device includes determining whether the first device is accelerated prior to the physical interaction.

8. The method of claim 6 wherein determining the role for the first device includes determining the role based on a device profile for the first device.

9. The method of claim 6 wherein determining the role for the first device includes determining the role in response to a user selection.

10. The method of claim 6 wherein determining the role for the first device includes determining the role based on an operating state of the first device.

11. The method of claim 1, wherein the message directed to the network address is sent from the first device to the second device, and wherein the network address comprises a first network address, the method further comprising:
    detecting, at the second device, the physical interaction between the second device and the first device;
    determining a second network address for the second device based on the information derived from the detected physical interaction; and
    receiving the message sent by the first device directed to the second network address for the second device, wherein the first and second network addresses are substantially similar.

12. The method of claim 1 wherein the network address is assigned to the first device, the method further comprises registering the network address with a network node to allow the second device to communicate with the first device using the registered network address.

13. The method of claim 1 further comprising using the network address in a virtual network layer that resides on top of an existing network infrastructure.

14. The method of claim 1 further comprising using the network address in an application layer.

15. The method of claim 1 further comprising using the network address as a network alias.

16. The method of claim 1 further comprising automatically performing a predefined action associated with the detected physical interaction.

17. The method of claim 16 further comprising determining which action to perform based on a profile of the first device.

18. The method of claim 16 further comprising determining which action to perform by providing a user with a list of actions from which to choose and performing a selected one of the actions.

19. The method of claim 16 wherein the performed predefined action is to transfer content to the first device from the second device.

20. A non-transitory computer-readable medium containing program instructions for establishing communication with a device, the program instructions for:
    detecting, at a first device, a physical interaction between the first device and a second device;
    determining a network address usable for establishing communication between the first and second devices based on information derived from the detected physical interaction; and
    providing for at least one of sending a message directed to the network address from the first device to the second device and assigning the network address to the first device for receiving a message directed to the network address.

21. A network-enabled device comprising:
    means for communicating with other network-enabled devices over a network;
    means for detecting and measuring a physical interaction with another network-enabled device and producing a corresponding physical interaction signal; and
    means for generating a network address representative of characteristics of the physical interaction signal.

22. A network-enabled device comprising:
- a communication transceiver for communicating with other network-enabled devices over a network;
- a motion detection module for detecting and measuring a physical interaction with another network-enabled device and producing a corresponding physical interaction signal; and
- an address generator for generating a network address representative of characteristics of the physical interaction signal.

23. The network-enabled device of claim 22 comprising a valid tap detector for determining when the network-enabled device is subject to a valid physical interaction.

24. The network-enabled device of claim 23 wherein the valid tap detector determines from time between impacts and amplitudes of the impacts whether a valid tap sequence has occurred.

25. The network-enabled device of claim 22 wherein the physical interaction comprises motion and the physical interaction signal corresponds to a tap sequence.

26. The network-enabled device of claim 22 wherein the motion detector module detects characteristics of a tapping sequence, wherein the tapping sequence characteristics include timing information and acceleration information.

27. The network-enabled device of claim 26 wherein the timing information and the acceleration information include at least one of how many taps occurred within a period of time, time separating the taps, magnitude of the acceleration caused by the taps, and a rate of change of the accelerations.

28. The network-enabled device of claim 22 wherein the address generator generates the network address representative of a signature based on time between taps.

29. The network-enabled device of claim 28 wherein the signature is calculated based on an absolute time occurrence of the taps.

30. The network-enabled device of claim 22 comprising means for determining a role for the network-enabled device, wherein the roles include a responder that sends a message directed to the generated network address and an initiator that provides for assigning the network address to the network-enabled device for receiving a message directed to the network address.

31. A system comprising:
- a first device and a second device coupled to a network, wherein both the first device and the second device include means for generating a network address representative of the characteristics of a physical interaction detected between the first device and the second device; and
- a server coupled to the network and configured for:
- receiving a message from the first device requesting assignment of the network address generated by the first device based on the physical interaction between the first and second devices;
- assigning the generated network address to the first device;
- receiving a message from the second device that includes a destination network address to which the message should be routed, wherein the destination network address is generated by the second device based on the physical interaction;
- routing the message from the second device to the first device using the destination network address.

32. The system of claim 31 wherein the server is configured to route the message to the first device by mapping the destination network address to another network address.

* * * * *